W. B. PRATT.
VULCANIZED ARTICLE AND PROCESS OF PRODUCING THE SAME.
APPLICATION FILED MAY 5, 1920.
1,349,911. Patented Aug. 17, 1920.
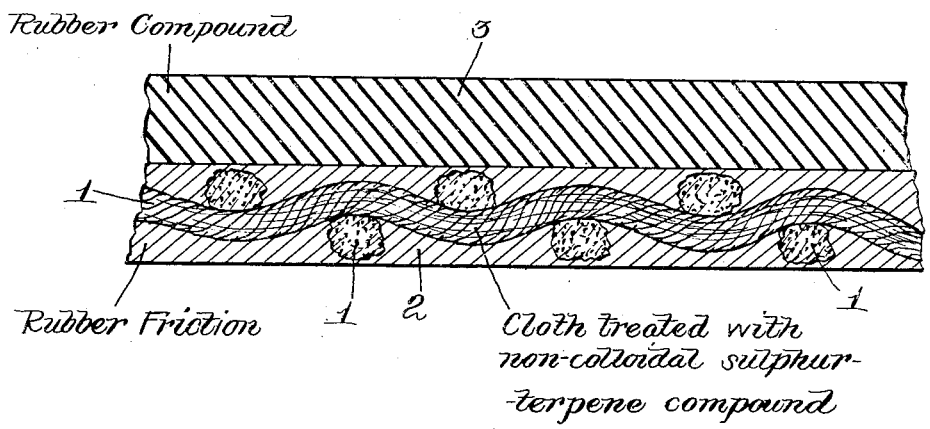
Inventor:
William Beach Pratt

UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

VULCANIZED ARTICLE AND PROCESS OF PRODUCING THE SAME.

1,349,911.   Specification of Letters Patent.   Patented Aug. 17, 1920.

Application filed May 5, 1920. Serial No. 378,942.

*To all whom it may concern:*

Be it known that I, WILLIAM BEACH PRATT, a citizen of the United States, residing at Wellesley, in the county of Norfolk and State of Massachusetts, have invented new and useful Improvements in Vulcanized Articles and Processes of Producing the Same, of which the following is a specification.

This invention has for its object the production of a new vulcanized product or fabrication which may be employed in many different forms of manufacture, such, for example, as belting, vehicle tires (both solid and pneumatic), rain coats, shoe soles and heels, hot water bottles, carriage tops, waterproof coverings, paulins, etc.

A product made in accordance with the present invention includes a fibrous body or foundation treated or impregnated with a neutral amorphous non-colloidal sulfur compound, and a contiguous rubber body, all vulcanized into a coherent state.

The fibrous body or foundation may consist of a thread, cord or rope, or of paper or felt, or of a braided woven or knitted material capable of absorbing a liquid, and hence, in employing the term "fibrous material," I mean to include the articles mentioned, as well as other articles or products formed of cotton, jute, hemp, wool, paper pulp, asbestos or the like.

A sulfur terpene compound which is herein described with which the fibrous body is treated, differs from crude or vulcanized rubber in that it is non-colloidal and capable not only of entering the canals of hollow fibers, such, for example, as cotton, but of permeating the walls thereof. Such non-colloidal compound may be produced by digesting a suitable terpene with sulfur at atmospheric pressure and at a temperature of 140° C. and above. For example, the product may be prepared by digesting oil of turpentine (or its equivalent) and sulfur, in the ratio of about 2 parts by weight of the former to 1.5 parts of the latter (or, if desired, in equal parts) in a reflux condenser. The mass is heated to about 140° C. or above, until hydrogen sulfid is evolved, and the reaction, which is progressive, is continued until the mass on cooling to ordinary temperatures is semi-solid or solid, as preferred. The time of treatment depends upon the desired consistency of the product, the temperature, and whether the mass is agitated. When the reaction is carried to completion, the resulting product is a hard tough black mass, breaking with a conchoidal fracture, presenting a vitreous luster on the surface of the fracture. It is neither acid nor alkaline, is soluble in turpentine with reaction, partly soluble in acetone, soluble in toluol and xylol, and insoluble in water.

When heated to a liquid condition, or when dissolved in a solvent, the sulfur terpene compound is capable of passing through parchment and by this test is non-colloidal.

In preparing my new fabrication, the fibrous body is treated with the non-colloidal sulfur terpene solution, as by passing it through a tank containing the solution or by painting or spreading the solution thereon, and the solvent is removed from the fibrous body by heat treatment or other suitable process. The crude rubber is compounded with such proportion of sulfur as may be desired; and the fibrous body is coated therewith in any suitable way, so as to bring the treated fibrous material and the rubber compound into contact. The article thus produced is then vulcanized under suitable conditions of heat, or heat and pressure, whereupon a coherent body is produced. In this product or fabrication, the non-colloidal sulfur compound, with which the fibers were treated, reacts during the vulcanization with rubber, with the result that the fibers contacting with the rubber are bonded therewith.

For example, a strip or sheet of material may be produced by treating woven cotton cloth with a solution of 1 part of said sulfur terpene compound to 4 parts (by weight) of xylol, then removing the solvent, then by a mechanical agency frictioning the treated cloth, with a suitable "friction," namely, crude rubber and sulfur compound (with or without compounding materials, *e. g.* litharge, zinc oxid, or the like, as desired), and a sheet or layer of rubber compound is then laid and pressed on the frictioned surface of the cloth. The structure thus formed is subjected to vulcanization under proper conditions of heat, or heat and pressure, whereupon the rubber layer becomes bonded to the woven cloth, in a manner impossible when a rubber layer is vulcanized to frictioned fabric not previously treated as herein described.

On the accompanying drawing, I have illustrated conventionally and on a magnified scale a structure as last described, with legends indicating the materials employed. The impregnated or treated woven cotton cloth is indicated at 1, the rubber "friction" at 2, and the layer of rubber compound at 3.

Ordinarily, when a highly compounded "friction" is applied to gray goods (i. e., untreated cotton fabric),the tensile strength between layers of such frictioned fabric markedly decreases according to the increased proportion of compounding material or the decrease in proportion of crude rubber. This is, of course, due to the fact that there is less adhesive quality to such rubber compounds, although the strength of such highly compounded rubber is much greater than the strength of a compound made up of sulfur and rubber, without a large proportion of compounding materials. The great advantage obtained through the use of a fabric, treated with a non-colloidal sulfur terpene compound, is that such treated fabric contains in itself the bond for uniting the fabric with the rubber compounds, and advantage can be taken of the greatly increased strength of highly compounded rubber products without decreasing the strength of the bond between the fabric and such rubber compounds. Thus, in the present case, the fabric is impregnated with a non-colloidal amorphous material which under vulcanization chemically reacts with the sulfur rubber compound, a result which I believe to be new.

Furthermore, in frictioning the treated fabric with a calender roll, sufficient heat is generated, or is provided, to soften the impregnating sulfur terpene compound, with the result that the "friction" can be more uniformly applied in commercial practice, and a practically perfect initial adhesion secured.

Another advantage, due to the employment of a non-colloidal sulfur terpene compound as an impregnating material for fibrous bodies of the nature herein described, is that such materials when so treated or impregnated will withstand, without loss of strength, much higher temperatures than such materials when not so treated. This permits the operator to employ a greater flexibility in temperature control, in relation to the vulcanization of compounds selected, without injury to the fibrous material.

It is evident that a laminated product, of any suitable form or contour, may be produced by multiplying the alternate layers of treated fabric and rubber compound, or that the treated fabric may be inclosed within two layers of rubber, or that a single layer of rubber may be vulcanized to both faces of a single layer of treated fabric.

Threads, cords and ropes may be treated with the non-colloidal sulfur terpene compound, and vulcanized to an inclosing sheath of suitable rubber compound, for use in various industries.

Prior to the vulcanization of the treated fibrous material (or the treated and frictioned fibrous material) and the contiguous rubber compound, the said material with the rubber may be formed into an article or structure of desired shape, and the article then vulcanized. Thus hot water bottles, solid or pneumatic tires, and a great many other products or articles of manufacture may be produced, by practising the herein described process, which embodies the present invention.

Ordinarily when a cloth is frictioned and then, after the application of a rubber body to its frictioned face, the product is vulcanized, certain acids are formed, due to the presence of moisture in the fabric, and to the reaction of the sulfur and the rubber, and these acids are absorbed by the fibers, thus causing the presence of a destructive agent in the fabric, which hastens its rotting and disintegration. But by treating or impregnating the fabric as herein described, the presence of moisture is substantially eliminated, and the fibers are immunized against the action of the sulfur-acids if they are formed. The reaction between the sulfur terpene compound and the sulfur rubber compound is not attended by the withdrawal or abstraction of the impregnating compound from the fibers, but on the contrary, as hereinbefore stated, results in bonding the said compound, the fibers and the rubber together.

A solid tire and a pneumatic tire are, however, not herein claimed specifically as they form the subjects-matter of applications Serial No. 269,467, filed January 3, 1919 (renewed, Serial No. 338,116 on November 4, 1919), and Serial No. 269,468, filed January 3, 1919.

The herein described sulfur terpene compound and the process of making it, and a fibrous body treated with said compound, are not of themselves herein claimed, since they form the subject-matter of applications Serial No. 328,235, filed October 3, 1919, and Serial No. 270,228, filed January 8, 1909.

What I claim is:

1. The herein described process which comprises permeating the fibers of a fibrous material with a non-colloidal sulfur-terpene compound, bringing a rubber compound into contact with said fibrous material, and subjecting the resulting body to vulcanization.

2. The herein described process which comprises treating a fibrous material with a non-colloidal sulfur terpene compound and vulcanizing a rubber compound onto said material.

3. The herein described process which comprises treating a strip or sheet of fibrous material with a non-colloidal sulfur terpene, coating the same with a rubber compound and subjecting the same to vulcanization.

4. The herein described process which comprises treating a strip or sheet of fibrous material with a solution containing a non-colloidal sulfur terpene compound, causing the evaporation of the solvent, coating the sheet or strip with a layer of rubber compound, and then vulcanizing the product so formed.

5. The herein described process which comprises treating a strip or sheet of woven fibrous material with a solution containing a non-colloidal sulfur terpene compound, removing the solvent, mechanically frictioning such sheet with a crude rubber compound, placing a layer of rubber compound against the frictioned surface of such sheet, and then vulcanizing the product thus formed.

6. The herein described process which comprises impregnating a fibrous fabric with a non-colloidal sulfur-terpene compound capable of reacting with rubber, and frictioning such fabric with rubber.

7. A new manufacture comprising rubber, a fibrous body, and a non-colloidal sulfur-terpene compound bonding the rubber and fibrous body, all vulcanized together.

8. A new manufacture comprising rubber and a fibrous body treated with a non-colloidal sulfur terpene compound, all vulcanized together.

9. A new manufacture comprising a strip of fibrous material treated with a non-colloidal sulfur terpene compound and a contiguous layer of rubber compound, all vulcanized together.

10. A new manufacture comprising a strip or sheet of woven fibrous material, treated with a non-colloidal sulfur terpene compound and a contiguous layer or coating of rubber compound, all vulcanized together.

In testimony whereof I have affixed my signature.

WILLIAM BEACH PRATT.